(12) United States Patent
Liu et al.

(10) Patent No.: US 11,105,474 B2
(45) Date of Patent: Aug. 31, 2021

(54) LAMP HAVING AN ELONGATED LENS WITH VARYING REFLECTIVE PROPERTIES

(71) Applicants: Self Electronics Co., Ltd., Zhejiang (CN); Wanjiong Lin, Zhejiang (CN); Self electronics USA Corporation, Norcross, GA (US)

(72) Inventors: Xiaoyun Liu, Zhejiang (CN); Zuping He, Zhejiang (CN); Jianguo Dong, Zhejiang (CN); Kai Xu, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/948,758

(22) Filed: Sep. 30, 2020

(65) Prior Publication Data

US 2021/0140595 A1    May 13, 2021

(30) Foreign Application Priority Data

Nov. 7, 2019  (CN) .......................... 201911084197.0

(51) Int. Cl.
| | | |
|---|---|---|
| *F21S 4/28* | (2016.01) | |
| *F21V 3/00* | (2015.01) | |
| *F21V 7/00* | (2006.01) | |
| *F21Y 115/10* | (2016.01) | |
| *F21Y 103/10* | (2016.01) | |

(52) U.S. Cl.
CPC .................................. *F21S 4/28* (2016.01); *F21V 3/00* (2013.01); *F21V 7/0091* (2013.01); *F21Y 2103/10* (2016.08); *F21Y 2115/10* (2016.08)

(58) Field of Classification Search
CPC .. F21S 4/28; F21V 3/00; F21V 7/0091; F21Y 213/10
See application file for complete search history.

(56) References Cited

U.S. PATENT DOCUMENTS

| | | | |
|---|---|---|---|
| 10,876,708 B1* | 12/2020 | He ............................. | F21S 4/28 |
| 2011/0305024 A1* | 12/2011 | Chang ..................... | F21V 3/049 |
| | | | 362/294 |
| 2012/0140461 A1* | 6/2012 | Pickard ................... | F21V 29/75 |
| | | | 362/225 |

* cited by examiner

*Primary Examiner* — Anabel Ton
(74) *Attorney, Agent, or Firm* — Wang Law Firm, Inc.

(57) ABSTRACT

The invention discloses a lighting lamp comprising strip lamp holder, circuit board, light source and strip lens; the strip lens comprises light incident surface, two first total reflection surfaces located outside the light incident surface and respectively disposed on both sides of the main optical axis, two first light emitting surfaces respectively disposed on both sides of the main optical axis and located between the light incident surface and the first total reflection surface, two second total reflection surfaces located outside the light incident surface and respectively disposed on both sides of the main optical axis, and two second light emitting surfaces respectively disposed on both sides of the main optical axis and located between the second total reflection surface and the first light emitting surface on the same side. The lighting lamp of the present invention obtains a larger illumination range on the illumination surface with more uniform lighting.

19 Claims, 6 Drawing Sheets

LAMP HAVING AN ELONGATED LENS WITH VARYING REFLECTIVE PROPERTIES

RELATED APPLICATION

This application claims priority to a Chinese Patent Application No. CN 201911084197.0, filed on Nov. 7, 2019.

FIELD OF THE TECHNOLOGY

The present invention relates to the field of lighting technology, with particular emphasis on a lighting lamp.

BACKGROUND OF THE INVENTION

With the popularity of LED lamps, more and more occasions have begun to use LED lamps, such as home lighting in bedrooms, kitchens, living rooms, and commercial lighting such as freezers, cold chains, and shelves.

The LED chip is used as a point light source, and the light intensity distribution is fixed. However, in actual use, it needs to be focused or uniformly illuminated over a large area. For this reason, in the prior art, optical elements are generally arranged in the light emitting direction of the LED chip for light distribution so as to achieve the required light intensity distribution.

To improve the light output efficiency of LED lamps and reduce glare through changes in the structure and position of optical elements is the goal pursued by those skilled in the art. In the prior art, although many structures with uniform illumination to expand the light angle have also been proposed, there is still a need for improvement.

BRIEF SUMMARY OF THE INVENTION

In view of this, the present invention provides a lighting lamp to solve the above technical problems.

A lighting lamp, comprising:
strip lamp holder;
circuit board, arranged on the strip lamp holder, and the front side of the circuit board is a light source mounting surface;
light source, arranged on the light source mounting surface, light emitted from the light source being with a main optical axis and comprising a small-angle light and a large-angle light;
strip lens, provided in the light emitting direction of the light source, being with a length extension direction consistent with the strip lamp holder;
the strip lens comprises:
light incident surface, arranged in facing the light source;
two first total reflection surfaces, located outside the light incident surface along the light emitting direction of the light source and respectively disposed on both sides of the main optical axis, and two ends of the two first total reflection surfaces close to the light source are mutual close to each other, and being used to totally reflect the small-angle light toward a direction of the large-angle light;
two first light emitting surfaces, respectively disposed on both sides of the main optical axis and located between the light incident surface and the first total reflection surface for emitting reflected light from the first total reflection surface on the same side;
two second total reflection surfaces, located outside the light incident surface along the light emitting direction of the light source and respectively disposed on both sides of the main optical axis, and being with oblique outward setting for totally reflecting the large-angle light toward a direction of the small-angle light;
two second light emitting surfaces, respectively disposed on both sides of the main optical axis and located between the second total reflection surface and the first light emitting surface on the same side for emitting reflected light from the second total reflection surface on the same side.

advantageously, the light incident surface comprises:
small-angle light incident surface, set in the middle;
two large-angle light incident surfaces, arranged on both sides of the main optical axis and respectively arranged opposite to the second total reflection surface on the same side.

advantageously, the small-angle light incident surface is an arc-shaped surface with a light-concentrating effect.

advantageously, the large-angle light incident surface is a flat surface.

advantageously, the first total reflection surface and the first light emitting surface intersect to form an acute angle.

advantageously, the second total reflection surface and the second light emitting surface intersect to form an acute angle.

advantageously, the first light emitting surface and the second light emitting surface intersect to form an obtuse angle.

advantageously, the lighting lamp further comprises a strip lamp cover disposed outside the strip lens.

advantageously, the lighting lamp further comprises a light diffusion film that stretches light emitted from the light source along the length direction of the strip lens.

advantageously, the light diffusion film is disposed between the strip lens and the strip lamp cover.

advantageously, the strip lamp cover comprises an arched body and fixed edges formed by two sides of the arched body extending downward, and the fixed edge is connected to the strip lamp holder.

advantageously, the strip lamp holder is provided with a groove for accommodating and fitting with the fixing edge.

advantageously, a sealing strip is provided on the inner side and/or outer side of the fixed edge.

advantageously, both sides of the inner surface of the arched body close to the fixed edge are provided with steps that contract inward, and the light diffusion film is attached to the inner surface of the arched body and both sides of the light diffusion film abut against the steps.

advantageously, the strip lens is fixedly connected to the circuit board.

advantageously, the bottom surface of the strip lens is provided with positioning posts, and the circuit board is provided with a positioning hole cooperating with the positioning post, and the positioning post passes through the positioning hole and is thermally riveted and fixed on the back of the circuit board.

advantageously, end cover assembly is provided at both ends of the strip lamp holder.

advantageously, the light source comprises a plurality of LED chips spaced along the longitudinal direction of the strip lamp holder.

advantageously, the strip lamp holder is provided with a U-shaped groove for accommodating the circuit board.

advantageously, two inner side walls of the U-shaped groove are provided with opposite clamping grooves, the clamping grooves are used for plugging and installing the circuit board.

Technical Effect of the Invention

The lighting lamp of the present invention totally reflects the small-angle light of the light source to the far side of the illumination surface on both sides through the strip lens, while the large-angle light on both sides is totally reflected to the middle of the irradiated surface, so as to realize a larger illumination range and more uniform illumination on the illumination surface.

BRIEF DESCRIPTION OF THE DRAWINGS

The following describes embodiments of the present invention with reference to the accompanying drawings, in which.

DETAILED DESCRIPTION OF THE INVENTION

Hereinafter, specific embodiments of the present invention will be described in further detail based on the drawings. It should be understood that the description of the embodiments of the present invention is not intended to limit the protection scope of the present invention.

Figure 1:
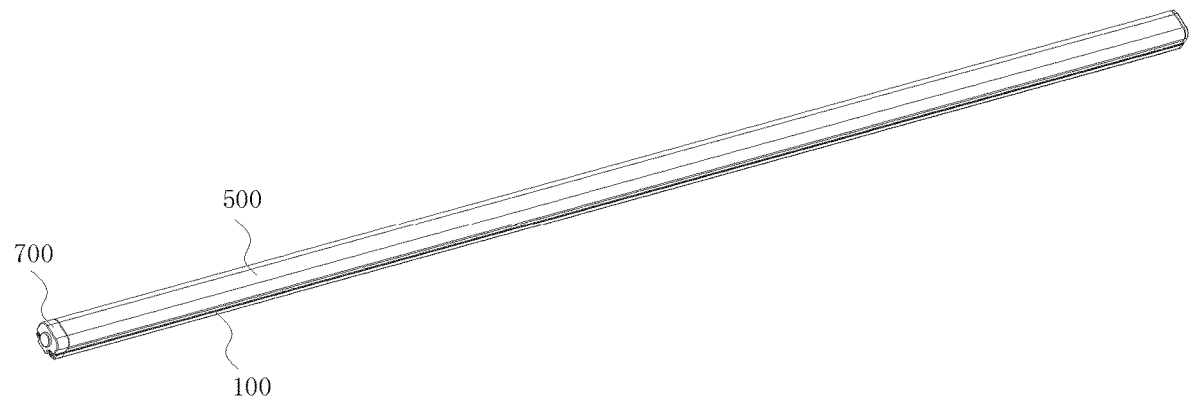
FIG. 1 is a schematic structural diagram of a lighting lamp of this embodiment.
Figure 2:
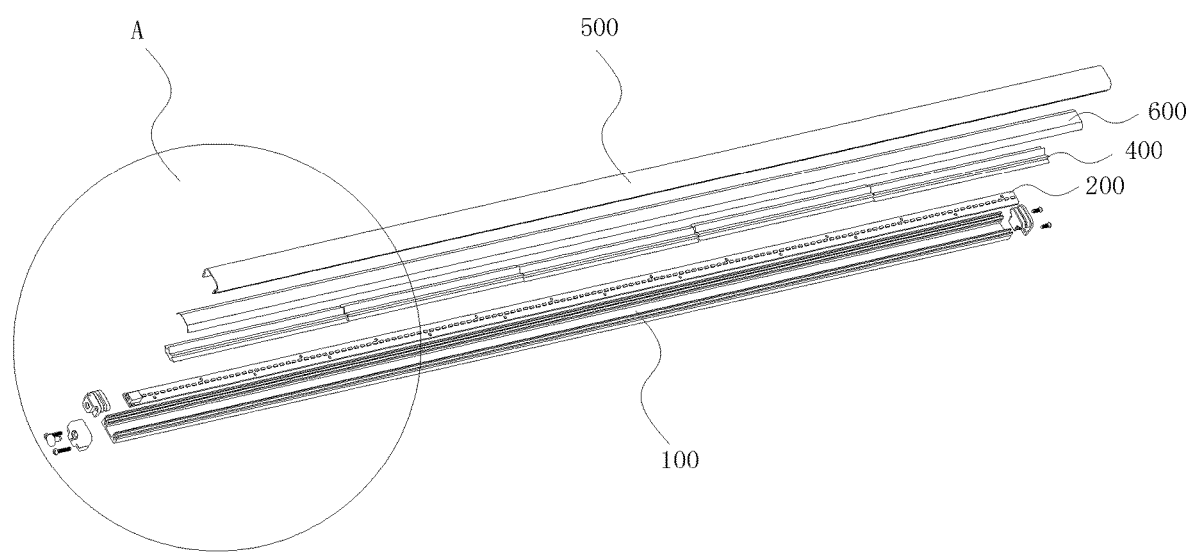
FIG. 2 is an exploded schematic view of a lighting lamp of this embodiment.
Figure 3:
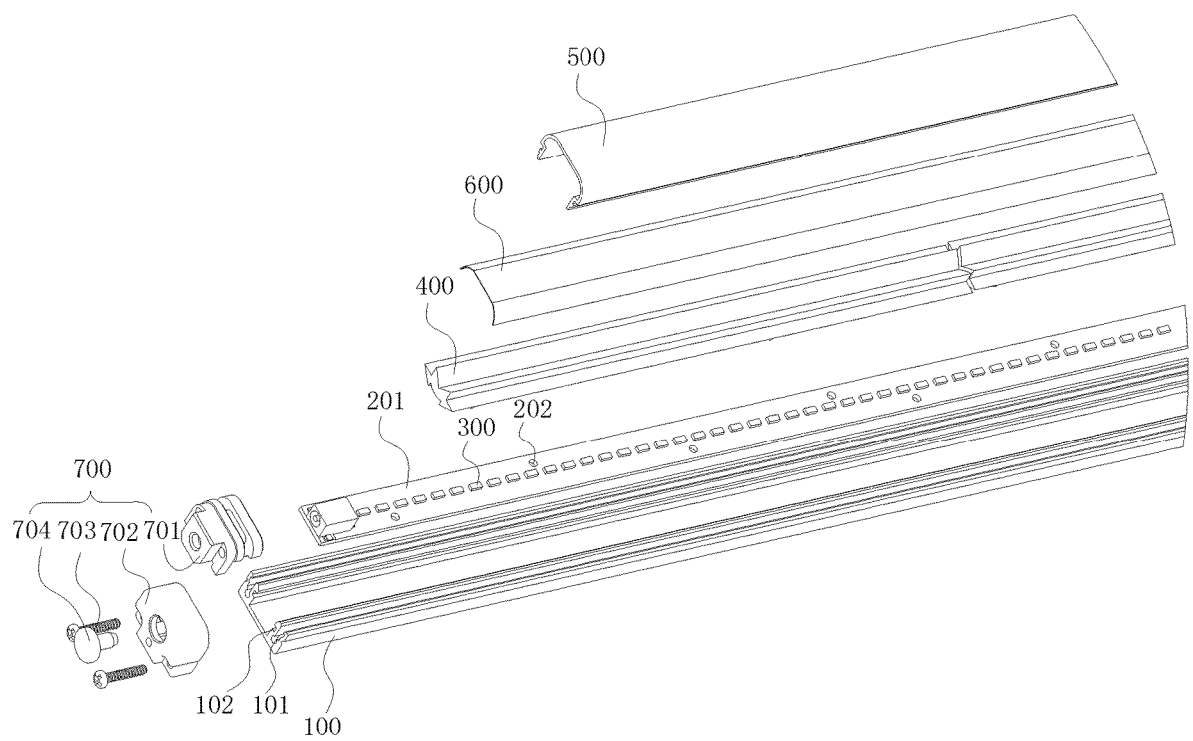
FIG. 3 is an enlarged schematic view of part A in FIG. 2.
Figure 4:
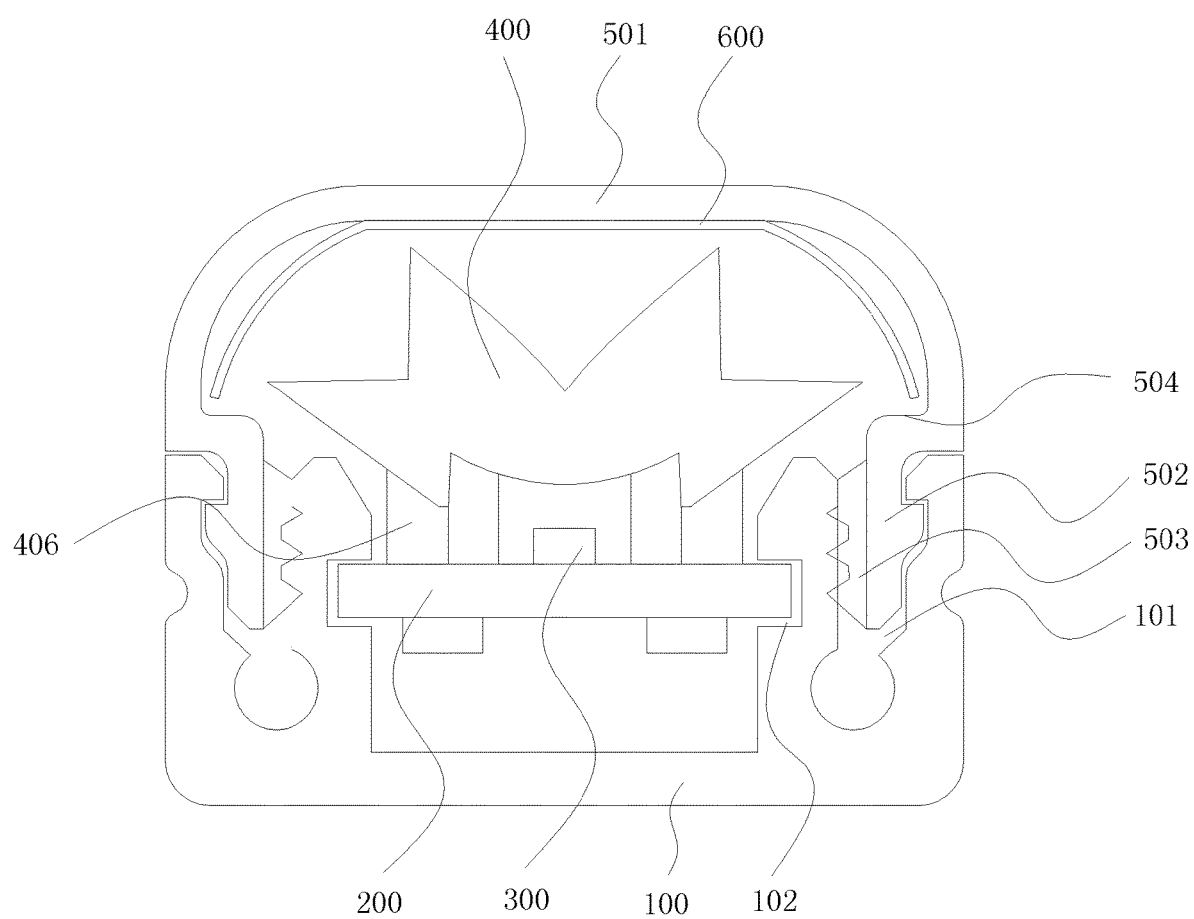
FIG. 4 is a schematic cross-sectional view of a lighting lamp of this embodiment on a plane perpendicular to the longitudinal direction.
Figure 5:
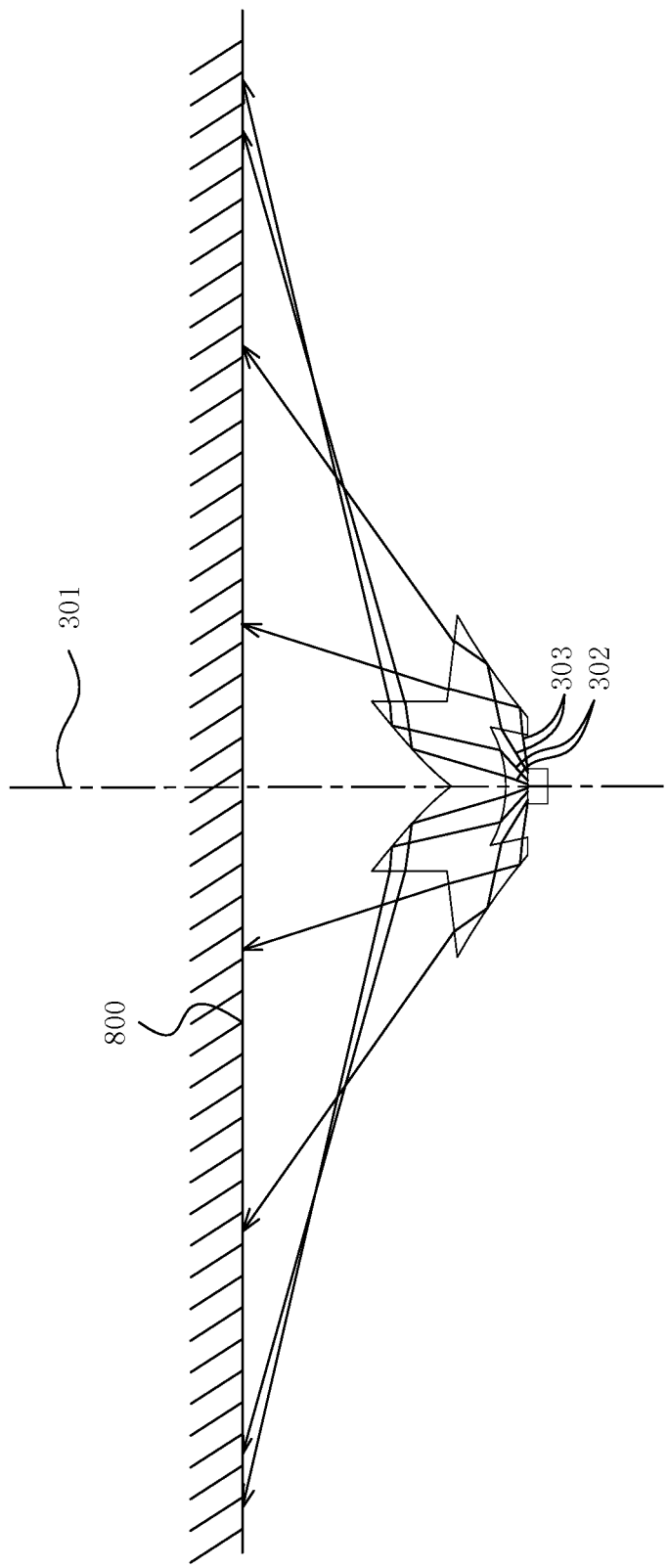
FIG. 5 is a light path diagram showing the strip lens assigns light from a light source.
Figure 6:
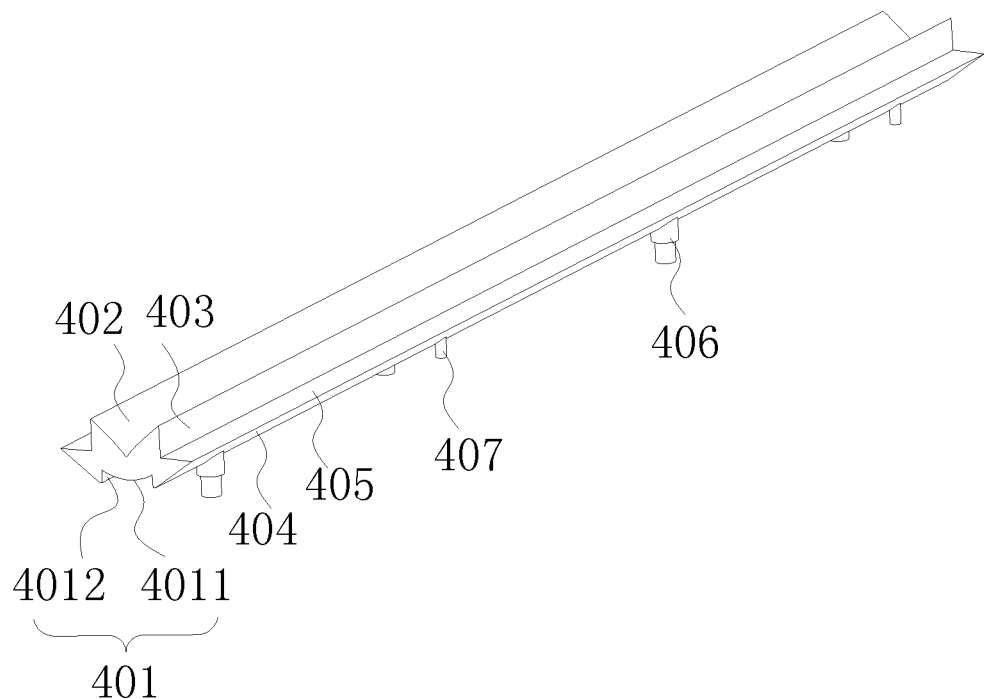
FIG. 6 is a schematic diagram of a three-dimensional structure of the strip lens of this embodiment.
Figure 7:
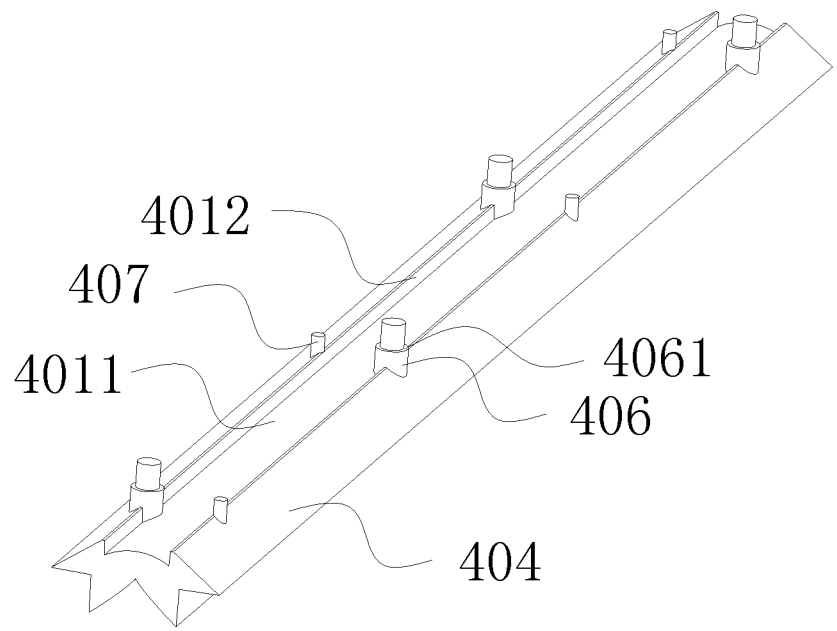
FIG. 7 is a schematic view of a three-dimensional structure of the strip lens of this embodiment at another angle.
Figure 8:
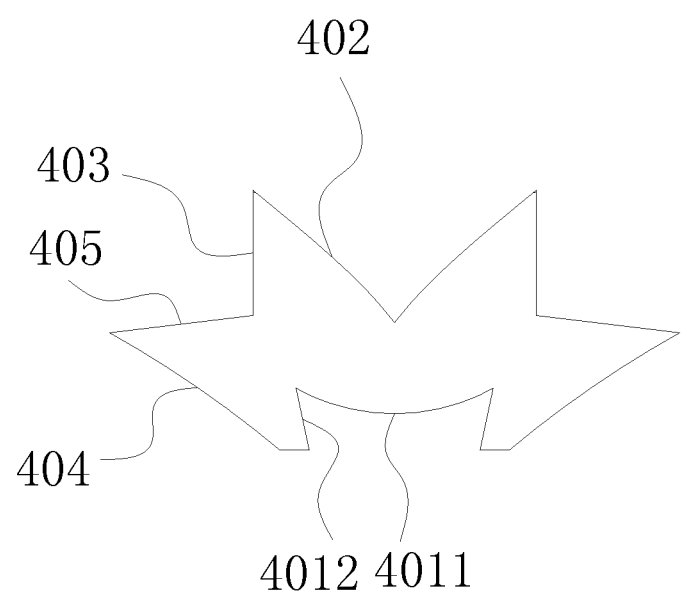
FIG. 8 is a schematic cross-sectional view of the strip lens of this embodiment on a plane perpendicular to the longitudinal direction.

As shown in FIGS. 1-8, the lighting lamp of this embodiment includes a strip lamp holder 100, a circuit board 200, a light source 300, a strip lens 400, a strip lamp cover 500, a light diffusion film 600, and an end cover assembly 700.

The strip lamp holder 100 is used to carry the other components mentioned above, and its shape and structure vary according to the assembly method and assembly position. In this embodiment, the structure of the strip lamp holder 100 is a U-shaped groove, which is used to install the above-mentioned circuit board 200, light source 300, strip lens 400, strip lamp cover 500, light diffusing film 600 and end cover assembly 700 within. of course, other shapes are also possible. The U-shaped groove is more convenient to install the circuit board 200, and to accommodate and shield the parts of the light source 300 that do not need to emit light.

The circuit board 200 is arranged on the strip lamp holder 100, the front side of the circuit board 200 is a light source mounting surface 201, and the light source 300 is arranged on the light source mounting surface 201. The light source 300 is in the form of an electric light source, the light emitted from the light source 300 is with a main optical axis 301 and includes a small-angle light 302 and large-angle light 303. The light source 300 emits light on the front of the circuit board 200, and the main optical axis 301 is perpendicular to the front of the circuit board 200. The small-angle light 302 refers to the light emitted from the light source 300 in the main optical axis 301 and its vicinity and the specific angle of the light can be artificially defined, generally between 10° and 70°. The large-angle light 303 is the light away from the main optical axis 301. In this embodiment, the circuit board 200 is installed on the strip-shaped lamp holder 100 in a plug-in manner, and opposite clamping grooves 102 are provided on both inner side walls of the U-shaped groove.

The end cover assembly 700 is provided at both ends of the strip lamp holder 100. The end cover assembly 700 plays a role of dustproof and waterproof. When the lighting lamp is used alone, it needs to be installed. In order to play a good sealing effect, glue injection can be used sealing. In this embodiment, the end cover assembly 700 includes a sealing plug 701, an end cover body 702, a locking screw 703 and a dust plug 704, the above structure is not the focus of the present invention and different designs can be made according to needs in the prior art, so it will not be repeated here.

The strip lens 400 is disposed in the light emitting direction of the light source 300, and the length extension direction is consistent with the strip lamp holder 100; the strip lens 400 is used to adjust light distribution of the light source 300 on the plane perpendicular to the length direction, the specific structure of the strip lens 400 as follows:

On a plane perpendicular to the length direction of the strip lamp holder 100, the strip lens 400 includes a light incident surface 401, two first total reflection surfaces 402, two first light emitting surfaces 403, and two second total reflection surface 404 and two second light emitting surfaces 405.

Wherein, the light incident surface 401 is disposed facing the light source 300 for introducing light into the lens, and may be a plane, a curved surface, or other shapes arranged above the light source.

The two first total reflection surfaces 402 are located outside the light incident surface 401 along the light emitting direction of the light source 300 and are respectively disposed on both sides of the main optical axis 301. Two ends of the two first total reflection surfaces 402 close to the light source 300 are mutual close to each other, which is used to totally reflect the small-angle light 302 toward the direction of the large-angle light 303; the first total reflection surface 401 is a flat surface, an curved surface, or a combination of multiple flat surfaces or curved surfaces. In this embodiment, in order to get better light distribution effect, the first total reflection surface 401 is formed by splicing multiple curved surfaces.

The above-mentioned mutual close refers that the two first total reflection surfaces 402 can be connected or non-connected. There is a spaced area in the middle of two first total reflection surfaces 402 if non-connected, the spaced area can allow light to emit or not to emit; total reflection occurs on both sides of the main optical axis 301 if connected, so all the small-angle light 302 is reflected to the direction of the large-angle light 303. Two first light emitting surfaces 403 are respectively disposed on both sides of the main optical axis 301 and arranged between the light incident surface 401 and the first total reflection surface 402 for emitting the reflected light from the first total reflection surface 402 on the same side, in this embodiment, the two first total reflection surfaces 402 are connected.

The two second total reflection surfaces 404 are located outside the light incident surface 401 along the light emitting direction of the light source 300 and are respectively disposed on both sides of the main optical axis 301, and are inclined outwardly to totally reflect the large-angle light 303 toward the direction of the small-angle light 302; the second total reflection surface 404 is disposed on the light path of the large-angle light 303. The second total reflection surface 404 is a flat surface, a curved surface, or a combination of multiple flat surfaces or curved surfaces. In this embodiment, the second total reflection surface 404 is a flat surface.

The two second light emitting surfaces 405 are respectively disposed on both sides of the main optical axis 301 and located between the second total reflection surface 404 and the first light emitting surface 403 on the same side for emitting the reflected light from the second total reflection surface 404 on the same side.

The lighting lamp of this embodiment is used for display lighting to achieve uniform illumination with a large angle. In general, the illumination surface 800 is perpendicular to the main optical axis 301 during installation, and the light source 300 is opposite to the illumination surface 800. If there is no strip lens 400, then the light in the middle position is the strongest and gradually weakens toward both sides. In the lighting lamp of this embodiment, a strip lens 400 is provided to totally reflect the small-angle light 302 emitted to the middle position to both sides through the two first total reflection surfaces 402 and then the light emit through the first light emitting surface 104, so as to illuminate the far ends of both sides of the illumination surface 800; the large-angle light 303 originally emitted to both sides is totally reflected toward the middle position through the second total reflection surface 105 and exits through the second light emitting surface 106, irradiates the near end in the middle of the illumination surface 800. The small-angle light 302 with a large light intensity is totally reflected to the far end, and the large-angle light 303 with a small light intensity is totally reflected to the near end to achieve even lighting.

Due to the change in the size of the strip lens 400 and the influence of the distance and area of the illumination surface 800, the angle of the first total reflection surface 402, the first light emitting surface 403, the second total reflection surface 404, and the second light emitting surface 405 relative to the illumination surface 800 can be set as needed to achieve the purpose of uniform illumination. In order to make the illumination uniform and symmetrical, in this embodiment, the first total reflection surface 402, the first light emitting surface 403, the second total reflection surface 404 and the second light emitting surface 405 on both sides of the main optical axis 301 are symmetrically arranged.

The light incident surface 401 can adjust the light for the first time, which is beneficial to the subsequent two sets of total reflection surfaces for more efficient light distribution, further uniform illumination, and improved light efficiency. Preferably, the light incident surface 401 includes a small-angle light incident surface 4011 and two large-angle light incident surface 4012. The small-angle light incident surface 4011 is disposed in the middle. The two large-angle light incident surfaces 4012 are arranged on both sides of the main optical axis 301 and arranged opposite to the second total reflection surface 404 on the same side.

The small-angle light incident surface 4011 adjusts the small-angle light 302 located in the middle. In order to make more small-angle light enter the first total reflection surface 402, the small-angle light incident surface 4011 is a arc-shaped surface with a light-concentrating effect for concentrating more small-angle light; the large-angle light incident surface 4012 is a plane, which is easier to manufacture.

In order to better distribute the small-angle light 302, preferably, the first total reflection surface 402 and the first light emitting surface 403 intersect to form an acute angle; the second total reflection surface 404 and the second light emitting surface 405 intersect to form an acute angle; the first light emitting surface 403 and the second light emitting surface 405 intersect to form an obtuse angle.

The light source 300 is used singly or in multiples. Preferably, the light source 300 includes a plurality of LED chips spaced along the longitudinal direction of the strip lamp holder 100. In the context of energy saving and environmental protection, LED lamps are increasingly used in the field of home and commercial lighting because of their high light extraction efficiency and good light collection performance.

The light diffusion film 600 stretches the light emitted from the light source 300 along the length direction of the strip lens 400, the light diffusion film 600 is disposed between the strip lens 400 and the strip lamp cover 500, and the light diffusion film 600 is used to stretch the light emitted from the light source 300, stretch the point light source into a linear light source along the length direction.

The strip lamp cover 500 includes an arched body 501 and fixed edges 502 formed by both sides of the arched body 501 extending downwards. The fixed edge 502 is connected to the strip lamp holder 100. In this embodiment, two sides of the U-shaped groove of the strip lamp holder 100 are provided with a groove 101 for accommodating and fitting with the fixed edge 502. In order to achieve the effect of waterproof sealing, a sealing strip 503 is provided inside the fixed edge 502. The sealing strip 503 and the strip lamp cover 500 can be manufactured by a co-extrusion process.

In order to facilitate the installation of the light diffusion film 600, in this embodiment, both sides of the inner surface of the arched body 501 close to the fixed edge 502 are provided with steps 504 that contract inward, and the light diffusion film 600 is attached to the inner surface of the arched body 501 and both sides of the light diffusion film 600 abut against the steps 503. Since the light diffusion film 600 has certain elasticity, it can be bent. After being bent along the width direction, the light diffusion film 600 is put into the arched body 501 and both sides abut against the step 504 to achieve fixation, which is convenient for installation and manufacturing. The light diffusion film 600 can be installed close to the strip lamp cover 500 and away from the light source 300 as far as possible, so as to achieve better tensile effect.

The light diffusion film 600 is an optical film provided with a positive cylindrical lens microarray, and the microarray is arranged in the longitudinal direction. In this embodiment, specifically, the light diffusion film 600 is an elliptical light diffusion film, which can be obtained through purchase. The brand is Zhuo Dejia, the model is E-6010, of course, other models can also be selected, as long as the point light source 300 is stretched in the arrangement direction (x direction) of the point light source 300, such as E-1560, E-0160/6001, E-0190, in order to achieve a better stretching and diffusion effect, when the diffusion film is selected, the stretching ratio in both directions is greater than 4. In this embodiment, the light diffusion film 600 is a positive cylindrical lens microarray, which has a small volume, is easy to install, and can be bent to meet different lamp structure requirements.

The strip lens 400 is fixed on the strip lamp holder 100 or directly fixed on the circuit board 200. Since the positional relationship between the strip lens 400 and the light source 300 of the present invention needs to be accurately positioned, in this embodiment, the strip lens 400 is fixedly connected to the circuit board 200. The light source 300 is disposed on the circuit board 200, and the fixed connection between the strip lens 400 and the circuit board 200 improves the accuracy of installation.

The fixed connection can be fixed by glue or fastened. In order to reduce components and ensure the accuracy of installation, in this embodiment, the bottom surface of the strip lens 400 is provided with positioning posts 406, and the circuit board 200 is provided with a positioning hole 202 cooperating with the positioning post 406. The positioning post 406 passes through the positioning hole 202 and is thermally riveted and fixed on the back of the circuit board 200. A positioning step 4061 is provided on the positioning post 406.

The number and arrangement of the positioning posts 406 can be set according to needs. Generally, for stability, each strip lens 400 needs at least three positioning posts 406, which are arranged along the length direction and arranged cross-misaligned in the width direction. In order to further improve the reliability of the fixing, each positioning post 406 is provided with a matching support post 407, which is also provided on the strip lens 400. The positioning post 406 and the support post 407 in match distributed on both sides of the strip lens 400 along the width direction.

The strip lens 400 of this embodiment is manufactured by an injection molding process, and the length should not be too long. When the lighting lamp is long, the strip lens 400 can be manufactured in sections. In this embodiment, the strip lens 400 is divided into five sections.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A lighting lamp, comprising:
strip lamp holder (100);
circuit board (200), arranged on the strip lamp holder (100), and the front side of the circuit board (200) is a light source mounting surface (201);
light source (300), arranged on the light source mounting surface (201), light emitted from the light source (300) being with a main optical axis (301) and comprising a small-angle light (302) and a large-angle light (303);
elongate lens (400), provided in the light emitting direction of the light source (300), being with a length extension direction consistent with the strip lamp holder (100);
characterized in that, the elongate lens (400) comprises:
light incident surface (401), arranged in facing the light source (300);
two first total reflection surfaces (402), located outside the light incident surface (401) along the light emitting direction of the light source (300) and respectively disposed on both sides of the main optical axis (301), and two ends of the two first total reflection surfaces (402) close to the light source (300) are mutual close to each other, and being used to totally reflect the small-angle light (302) toward a direction of the large-angle light (303);
two first light emitting surfaces (403), respectively disposed on both sides of the main optical axis (301) and located between the light incident surface (401) and the first total reflection surface (402) for emitting reflected light from the first total reflection surface (402) on the same side;
two second total reflection surfaces (404), located outside the light incident surface (401) along the light emitting direction of the light source (300) and respectively disposed on both sides of the main optical axis (301), and being with oblique outward setting for totally reflecting the large-angle light (303) toward a direction of the small-angle light (302);
two second light emitting surfaces (405), respectively disposed on both sides of the main optical axis (301) and located between the second total reflection surface (404) and the first light emitting surface (403) on the same side for emitting reflected light from the second total reflection surface (404) on the same side;
wherein, the light incident surface (401) comprises:
small-angle light incident surface (4011), set in the middle;
two large-angle light incident surfaces (4012), arranged on both sides of the main optical axis (301) and respectively arranged opposite to the second total reflection surface (404) on the same side.

2. The lighting lamp as claimed in claim 1, wherein the small-angle light incident surface (4011) is an arc-shaped surface with a light-concentrating effect.

3. The lighting lamp as claimed in claim 1, wherein the large-angle light incident surface (4012) is a flat surface.

4. The lighting lamp as claimed in claim 1, wherein the first total reflection surface (402) and the first light emitting surface (403) intersect to form an acute angle.

5. The lighting lamp as claimed in claim 1, wherein the second total reflection surface (404) and the second light emitting surface (405) intersect to form an acute angle.

6. The lighting lamp as claimed in claim 1, wherein the first light emitting surface (403) and the second light emitting surface (405) intersect to form an obtuse angle.

7. The lighting lamp as claimed in claim 1, wherein the lighting lamp further comprises a strip lamp cover (500) disposed outside the strip elongate lens (400).

8. The lighting lamp as claimed in claim 7, wherein the lighting lamp further comprises a light diffusion film (600) that stretches light emitted from the light source (300) along the length direction of the elongate lens (400).

9. The lighting lamp as claimed in claim 8, wherein the light diffusion film (600) is disposed between the elongate lens (400) and the strip lamp cover (500).

10. The lighting lamp as claimed in claim 9, wherein the strip lamp cover (500) comprises an arched body (501) and fixed edges (502) formed by two sides of the arched body (501) extending downward , and the fixed edge (502) is connected to the strip lamp holder (100).

11. The lighting lamp as claimed in claim 10, wherein the strip lamp holder (100) is provided with a groove (101) for accommodating and fitting with the fixing edge (502).

12. The lighting lamp as claimed in claim 11, wherein a sealing strip (503) is provided on the inner side and/or outer side of the fixed edge (502).

13. The lighting lamp as claimed in claim 10, wherein both sides of the inner surface of the arched body (501) close to the fixed edge (502) are provided with steps (503) that contract inward, and the light diffusion film (600) is attached to the inner surface of the arched body (501) and both sides of the light diffusion film (600) abut against the steps (504).

14. The lighting lamp as claimed in claim 1, wherein the elongate lens (400) is fixedly connected to the circuit board (200).

15. The lighting lamp as claimed in claim 14, wherein the bottom surface of the elongate lens (400) is provided with positioning posts (406), and the circuit board (200) is provided with a positioning hole (202) cooperating with the positioning post (406), and the positioning post (406) passes through the positioning hole (202) and is thermally riveted and fixed on the back of the circuit board (200).

16. The lighting lamp as claimed in claim 1, wherein end cover assembly (700) is provided at both ends of the strip lamp holder (100).

17. The lighting lamp as claimed in claim 1, wherein the light source (300) comprises a plurality of LED chips spaced along the longitudinal direction of the strip lamp holder (100).

18. The lighting lamp as claimed in claim 1, wherein the strip lamp holder (100) is provided with a U-shaped groove for accommodating the circuit board (200).

19. The lighting lamp as claimed in claim 18, wherein two inner side walls of the U-shaped groove are provided with opposite clamping grooves (102), the clamping grooves (102) are used for plugging and installing the circuit board (200).

\* \* \* \* \*